United States Patent
Chuang (10) Patent No.: US 7,077,302 B2
(45) Date of Patent: Jul. 18, 2006

(54) APPARATUS FOR SELECTIVELY ATTACHING A FIRST OBJECT TO A SECOND OBJECT IN A DESIRED ORIENTATION

(76) Inventor: Louis Chuang, 7F-8, No. 20, Ta Lon Road, Taichung (TW)

( * ) Notice: Subject to any disclaimer, the term of this patent is extended or adjusted under 35 U.S.C. 154(b) by 502 days.

(21) Appl. No.: 10/013,163

(22) Filed: Dec. 10, 2001

(65) Prior Publication Data

US 2003/0106919 A1    Jun. 12, 2003

(51) Int. Cl.
*B62J 7/06*    (2006.01)
*B62J 11/00*   (2006.01)
*B62J 7/00*    (2006.01)

(52) U.S. Cl. ............... 224/420; 224/416; 224/417; 224/431; 224/442; 224/547; 224/271; 248/224.51; 248/223.41

(58) Field of Classification Search ............ 224/271, 224/420, 425, 428, 431, 440, 441, 445, 447, 224/442, 450, 459, 403, 929, 935, 199, 584, 224/416, 415, 418, 456, 919, 461, 423, 463, 224/436, 374, 171, 194, 590.1, 417, 455, 224/431 X; 248/311.2, 229.51, 223.41 X, 248/269–291, 224.51 X; 403/331; 24/3.12, 24/3.1, 7.2, 229, 374, 171, 194, 590.1; 170/110; 229/547
See application file for complete search history.

(56) References Cited

U.S. PATENT DOCUMENTS

| | | | | |
|---|---|---|---|---|
| 5,181,774 A | * | 1/1993 | Lane | 362/549 |
| 5,406,816 A | * | 4/1995 | Thomas | 62/457.1 |
| 5,440,465 A | * | 8/1995 | Hasness | 362/191 |
| 5,718,134 A | * | 2/1998 | Chang | 70/233 |
| 5,730,342 A | * | 3/1998 | Tien | 224/271 |
| 5,735,441 A | | 4/1998 | Fujimoto | |
| 5,857,601 A | * | 1/1999 | Greenwood | 224/409 |
| 5,996,184 A | * | 12/1999 | Mah et al. | 24/3.12 |
| 6,264,351 B1 | | 7/2001 | Taylor et al. | |
| 6,315,182 B1 | * | 11/2001 | Chen | 224/420 |
| 6,484,989 B1 | * | 11/2002 | Connery | 248/311.2 |
| 6,695,269 B1 | * | 2/2004 | Anscher | 248/225.11 |

* cited by examiner

*Primary Examiner*—Tri M. Mai
(74) *Attorney, Agent, or Firm*—Alan D. Kamrath; Nikolai & Mersereau, P.A.

(57) ABSTRACT

An apparatus attaches a first object to a second object in a manner that the first object can be located in a desired orientation with respect to the second object. The apparatus includes an engaging member detachably mounted to the second object, e.g., a bicycle handlebar. The apparatus further includes a fixing member to which the first object, e.g., a headlamp of a bicycle or cellular phone bag is attached. The headlamp or cellular phone bag can be mounted to the engaging member in a desired orientation. The engaging member remains on the handlebar when reattaching the headlamp or cellular phone bag to the engaging member.

19 Claims, 13 Drawing Sheets

APPARATUS FOR SELECTIVELY ATTACHING A FIRST OBJECT TO A SECOND OBJECT IN A DESIRED ORIENTATION

BACKGROUND OF THE INVENTION

1. Field of the Invention

The present invention relates to an apparatus for selectively attaching a first object to a second object in a desired orientation. In particular, the present invention relates to an apparatus for attaching a first object, e.g., a headlamp to a second object, e.g., a bicycle handlebar in a manner that the first object can be located in a desired orientation with respect to the second object.

2. Description of the Related Art

A bicycle generally has a headlamp to provide illumination when required. U.S. Pat. No. 5,735,441 to Fujimoto issued on Apr. 7, 1998 discloses an apparatus for attaching two-wheeled vehicle parts allowing adjustment of the attachment angle. The apparatus comprises an attachment part 1 attached to a handle 27 of a bicycle 25, an attachment part 2 fixed on a head lamp 29 of the bicycle 25, and an attachment part 3 connecting the first and second attachment parts 1 and 2. The attachment parts 1 and 2 rotate relative to each other. The attachment parts 2 and 3 are detachable from each other by sliding of rail members 7a and 7b with grooves 17a and 17b. However, the head lamp 29 can only be adjusted in the horizontal position; namely, adjustment of the head lamp 29 in the vertical position cannot be achieved.

U.S. Pat. No. 6,264,351 to Taylor et al. issued on Jul. 24, 2001 discloses a convertible orientation bicycle lamp. The lamp holding member is capable of altering its orientation with regard to a base member such that the orientation of the lamp holding member vis-a-vis the clamping member may be altered. However, the lamps can only be pivoted about a fixed axis and thus have a limited adjustment in only one of the vertical plane and the horizontal plane. When adjustment of the lamps in an orthogonal plane is required, the whole clamp assembly to which the lamps are attached must be detached from the bicycle handlebar and then reattached to the handlebar in a different orientation.

SUMMARY OF THE INVENTION

An object of the present invention is to provide an apparatus for attaching a first object to a second object in a manner that the first object can be located in a desired orientation with respect to the second object.

The apparatus comprises an engaging member detachably mounted to the second object, e.g., a bicycle handlebar. The apparatus further comprises a fixing member to which the first object, e.g., a headlamp of a bicycle is attached. The headlamp can be mounted to the engaging member in a desired orientation. The engaging member remains on the handlebar when reattaching the headlamp to the engaging member.

In an embodiment of the invention, the engaging member comprises a polygonal member having a plurality of pairs of parallel sides. The fixing member to which the headlamp is mounted can be selectively engaged with one of the plurality pairs of parallel sides. The selective engagement between the fixing member and the parallel sides of the engaging member allows the headlamp to be located in a position providing optimal illumination.

In an embodiment of the invention, the first object is a cellular phone bag such that the user may securely put it on the handlebar while cycling. The selective engagement between the fixing member and the parallel sides of the engaging member allows the cellular phone to be located in an easy-to-access position.

Adjustment of the position of the first object (i.e., the cellular phone bag or the headlamp) can be achieved easily without detaching the whole apparatus from the handlebar of the bicycle.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
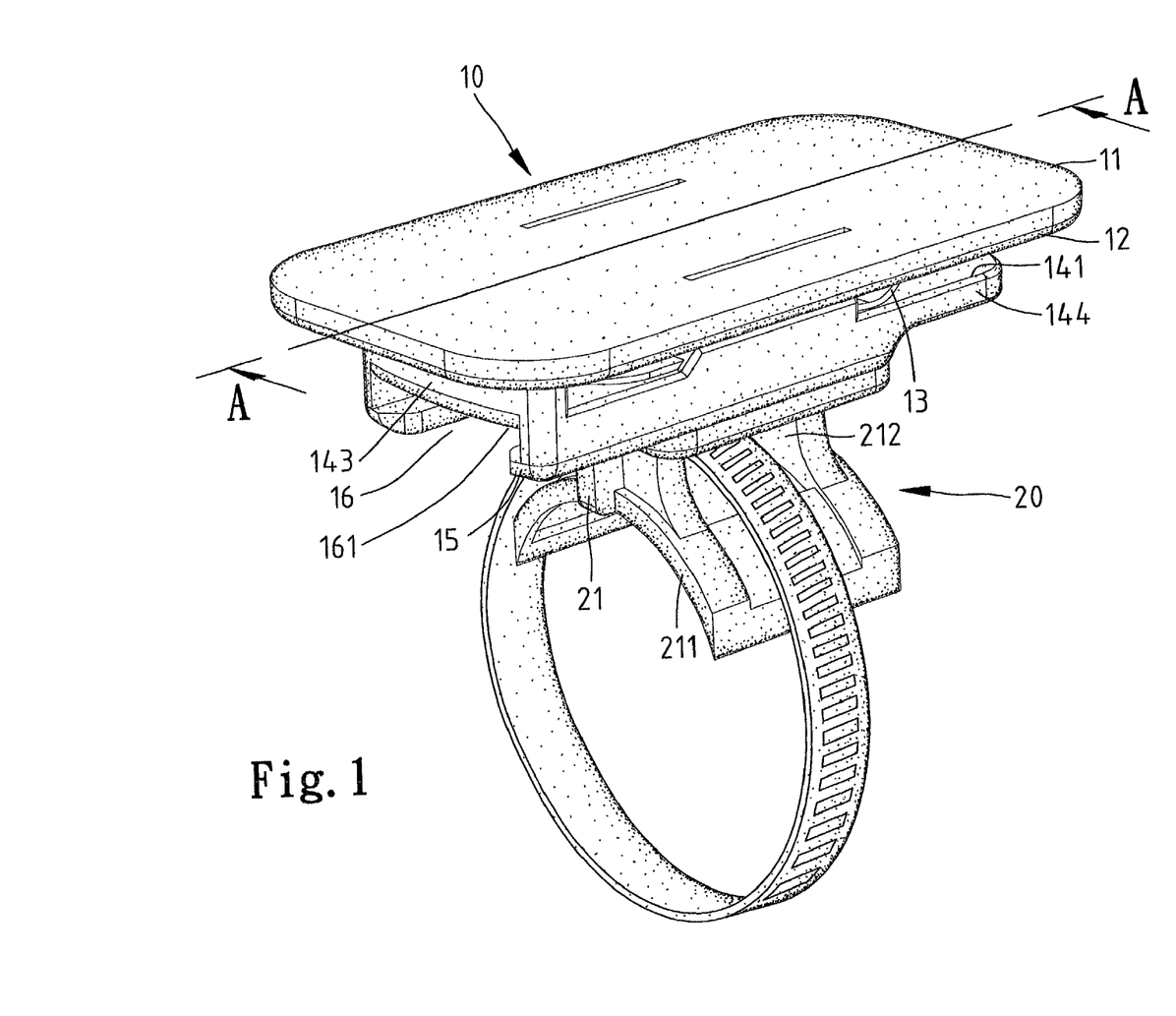
FIG. 1 is a perspective view of an attaching apparatus in accordance with the present invention.
Figure 2:
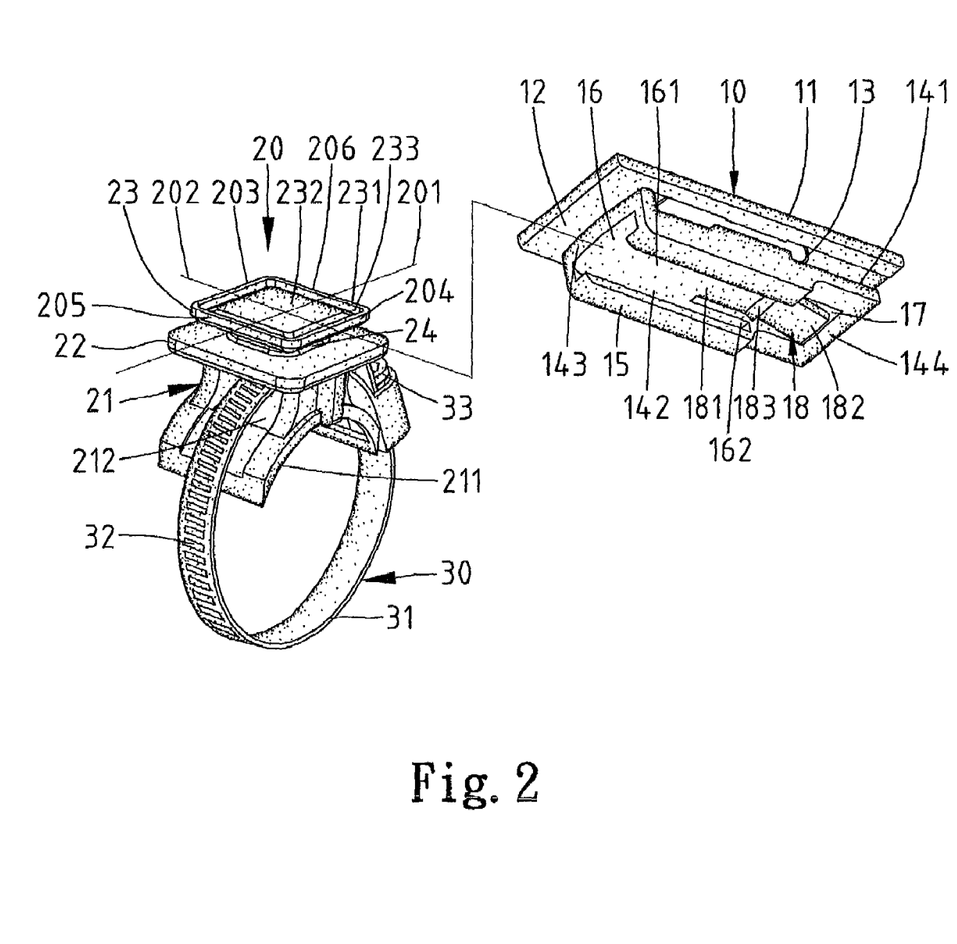
FIG. 2 is an exploded perspective view of the attaching apparatus in accordance with the present invention.
Figure 3:
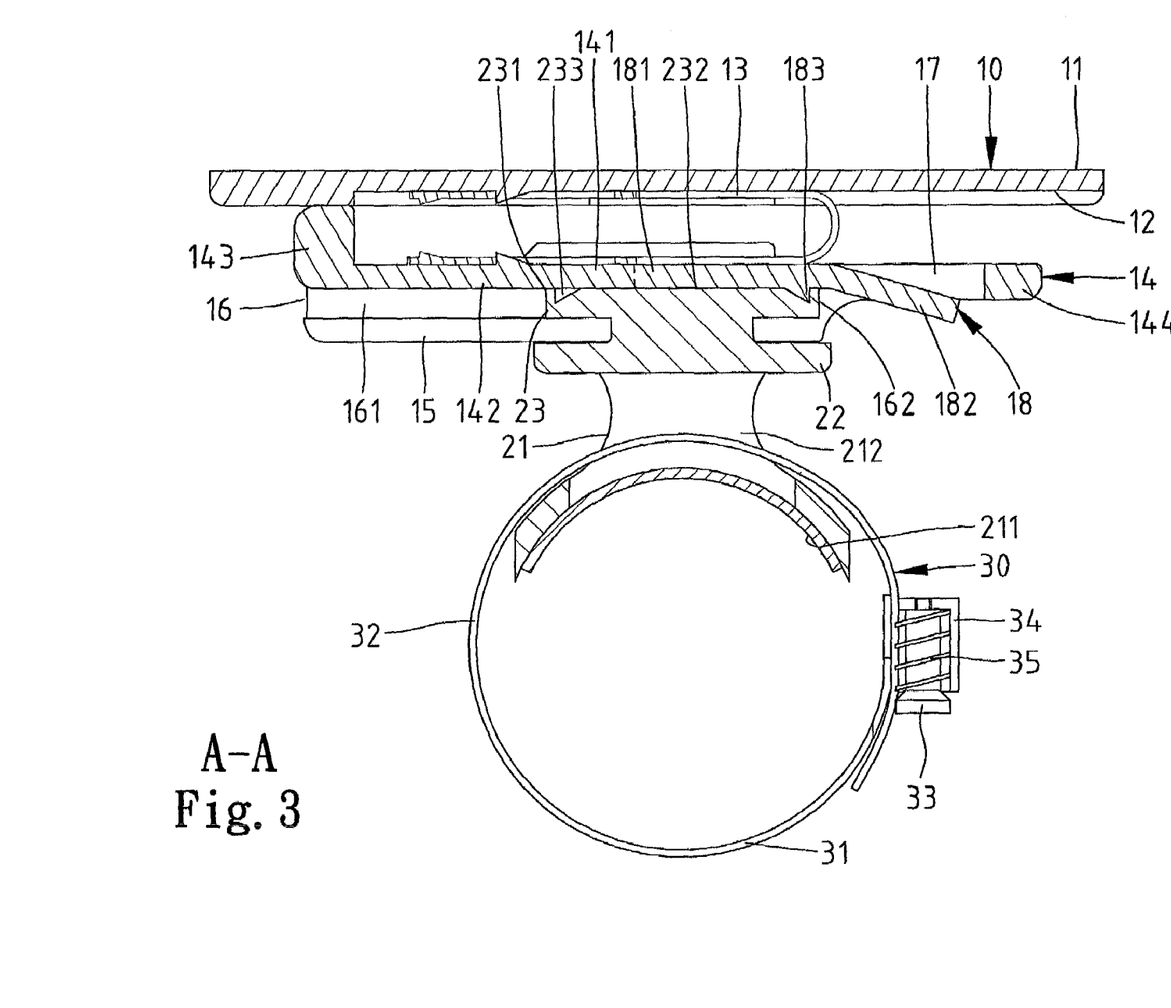
FIG. 3 is a sectional view taken along plane A—A in FIG. 1.

Referring to FIGS. 1 through 3, an attaching apparatus in accordance with the present invention generally comprises a fixing member 10 to which a first object, e.g., a cellular phone bag or a bicycle headlamp is attached. The attaching apparatus further comprises an engaging member 20 to which the fixing member 10 is releasably engaged. Further, the attaching apparatus comprises an attaching member 30 for attaching the engaging member 20 to a second object, e.g., a bicycle handlebar.

Figure 2A:
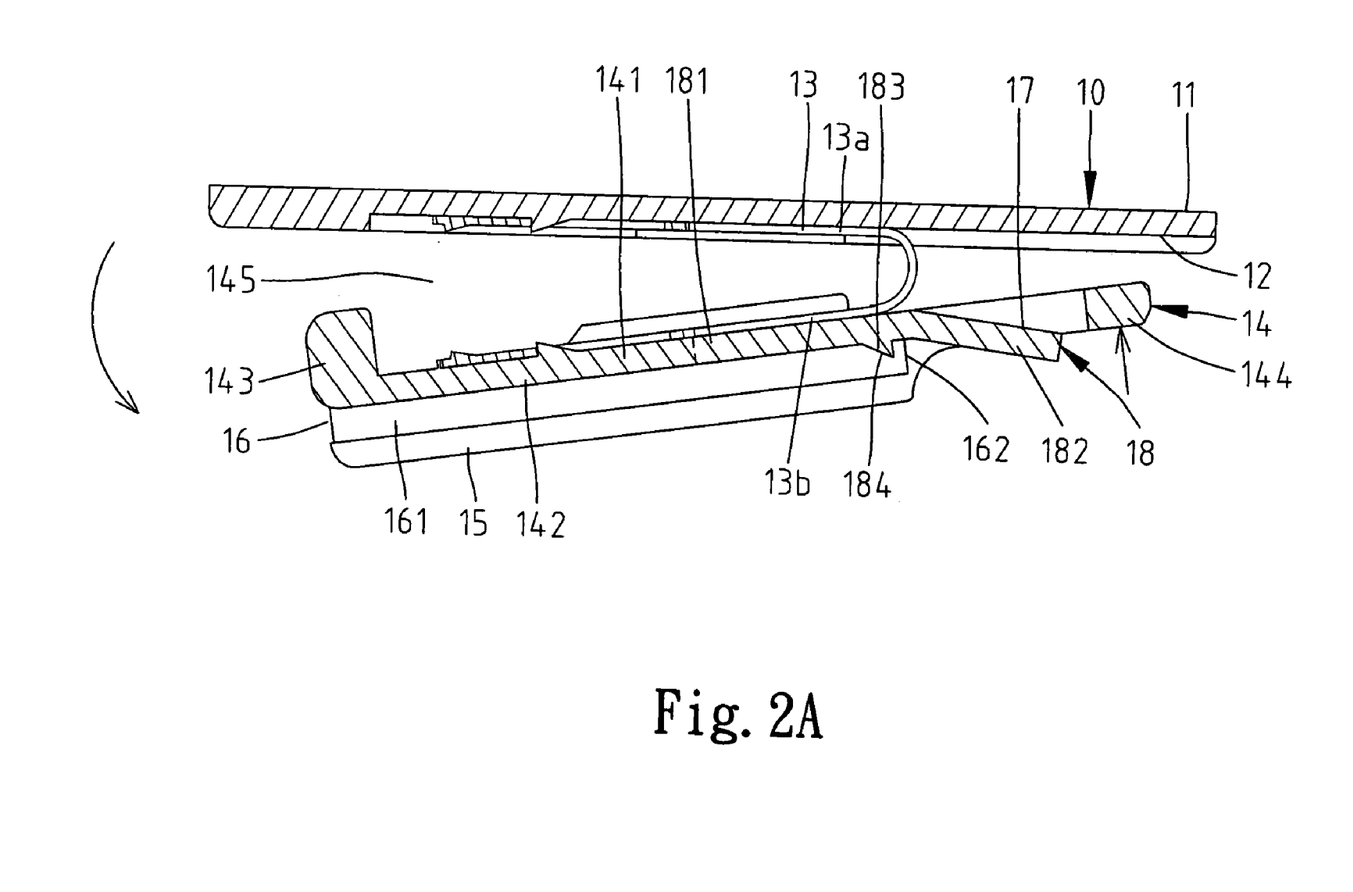
FIG. 2A is a side view, partly sectioned, of a fixing member of the attaching apparatus.
Figure 5:
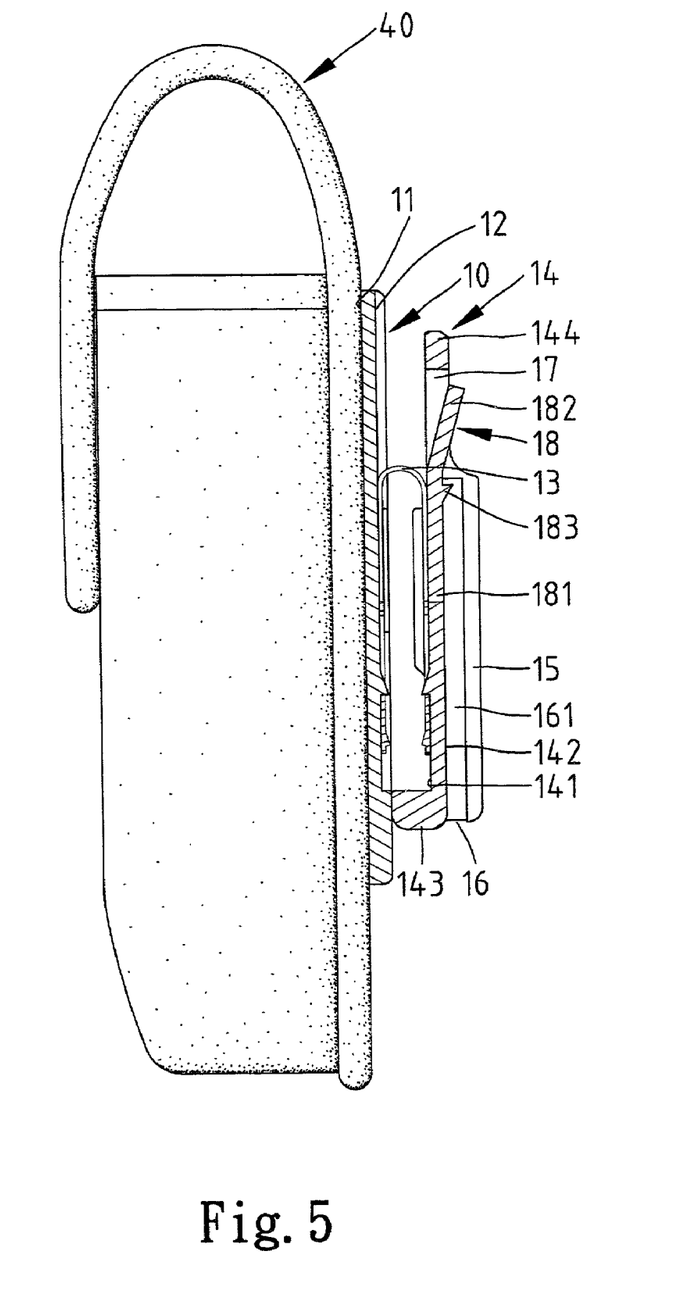
FIG. 5 is a schematic side view, partly sectioned, of a cellular phone bag and the fixing member of the attaching apparatus.
Figure 6:
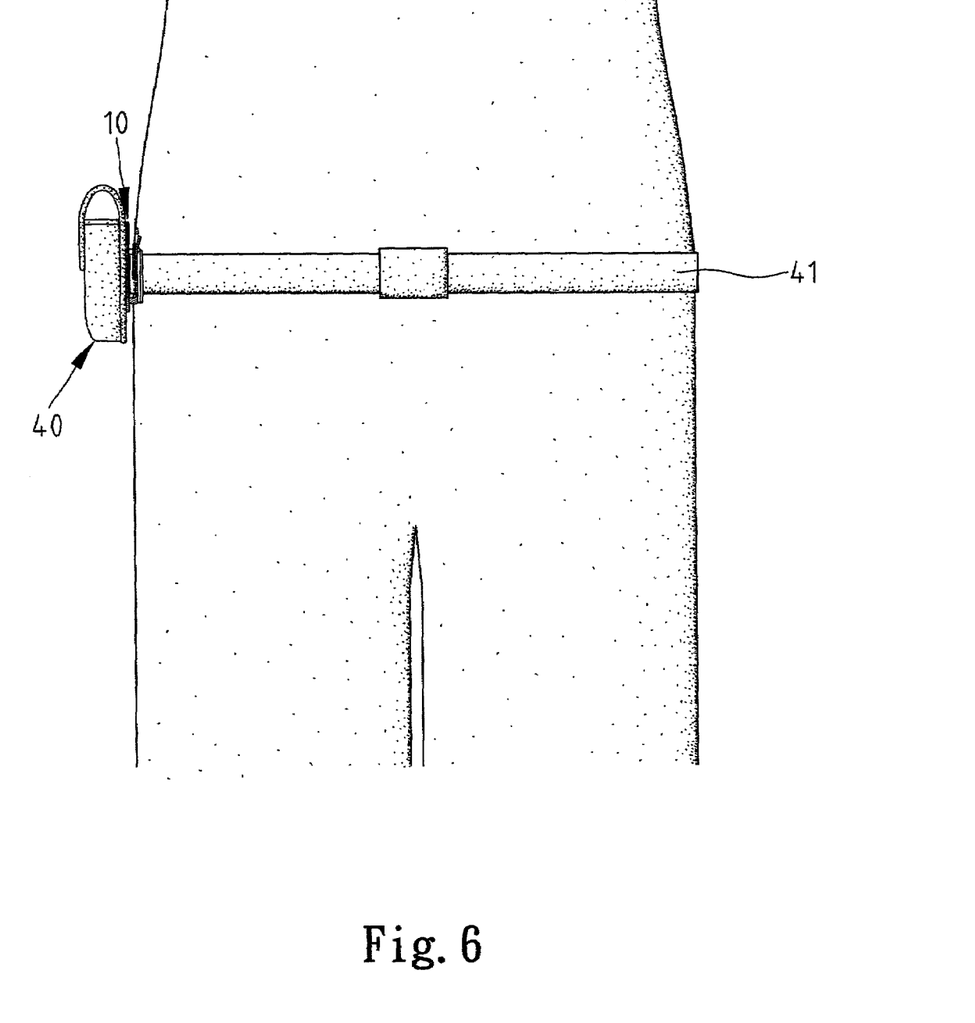
FIG. 6 is a schematic side view illustrating attachment of the attaching apparatus to a belt worn on a user.

Referring to FIGS. 2 and 2A, the fixing member 10 comprises a first side 11 and a second side 12 opposite to the first side. A substantially U-shaped elastic member 13 has a first limb 13a attached to the second side 12 of the fixing member 10 and a second limb 13b to which a first side 141 of a clamp member 14 is attached. The clamp member 14 comprises a press end 144 and a clamp end 143 opposite to the press end 144. The clamp end 143 of the clamp member 14 is biased by the elastic member 13 to engage with the second side 12 of the fixing member 10. As illustrated in FIG. 2A, when the press end 144 is pressed, the clamp end 143 is moved away from the fixing member 10. A cellular phone bag 40 can be securely attached to the first side 11 of the fixing member 10, as illustrated in FIG. 5. The fixing member 10 can be attached to a belt 41 worn on a user by means of using the clamp member 14. Namely, the press end 144 of the clamp member 14 is pressed to allow insertion of the belt 41 into a space 145 (FIG. 2A) between the clamp end 143 of the clamp member 14 and the second side 12 of the fixing member 10. The press end 144 of the clamp member 14 is then released, and the cellular phone bag 40 is securely attached to the belt 41 under the action of the elastic member 13, as shown in FIG. 6.

Turning back to FIGS. 2 and 2A, the clamp member 14 further comprises a groove 161 defined by two parallel ribs 15 projecting from a second side 142 of the clamp member 14. The second side 142 of the clamp member 14 forms a bottom wall that defines the groove 161. The groove 161 includes an opening 16 in the clamp end 143 of the clamp member 14 and terminates at an end wall 162 facing the opening 16. The press end 144 of the clamp member 14 further comprises a U-shaped slot 17, thereby forming a resilient tongue 18. In this embodiment, the resilient tongue 18 comprises a first end 181 integrally formed with the bottom wall defining the groove 161 and a free second end 182. A protrusion 183 is formed on the bottom wall (i.e., the second side 142 of the clamp member 14).

Figure 3A:
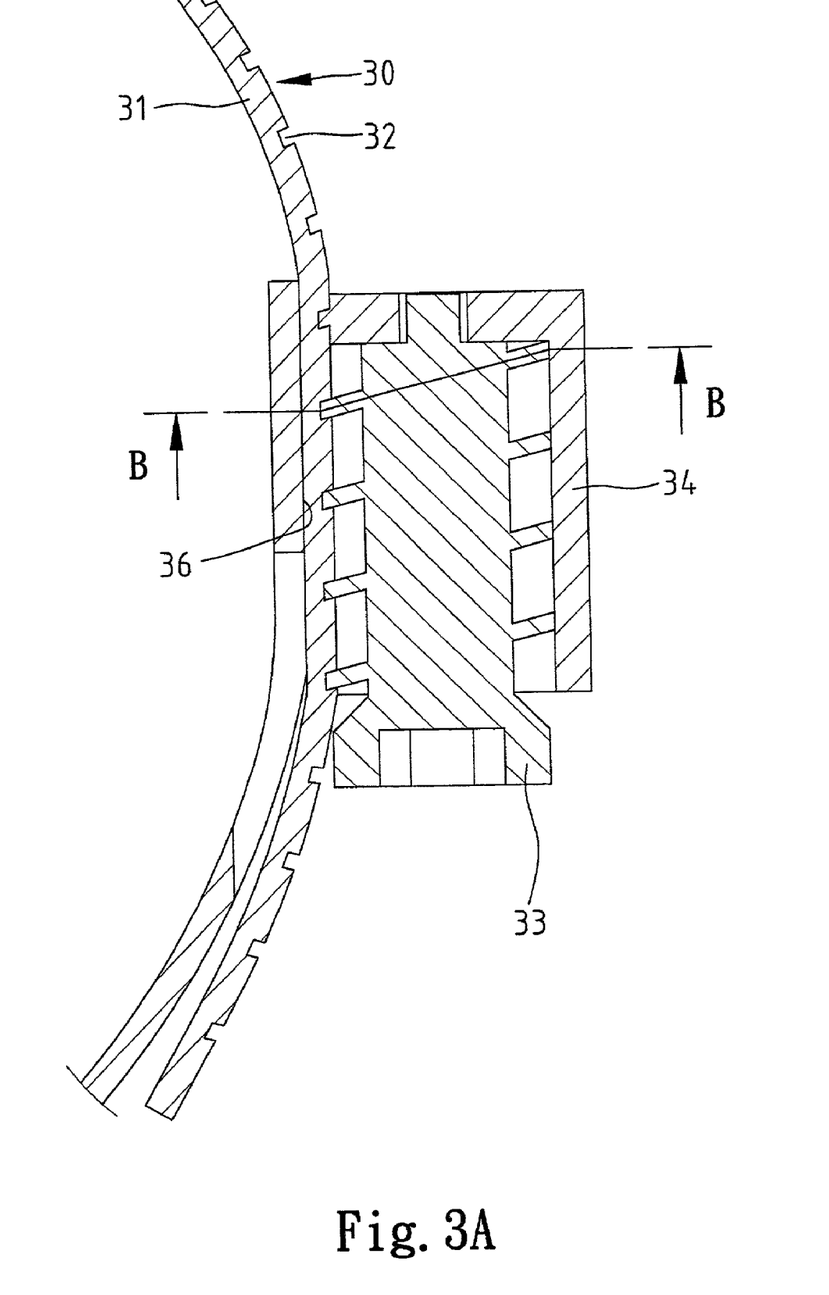
FIG. 3A is an enlarged sectional view of a portion of an attaching member of the attaching apparatus.
Figure 3B:
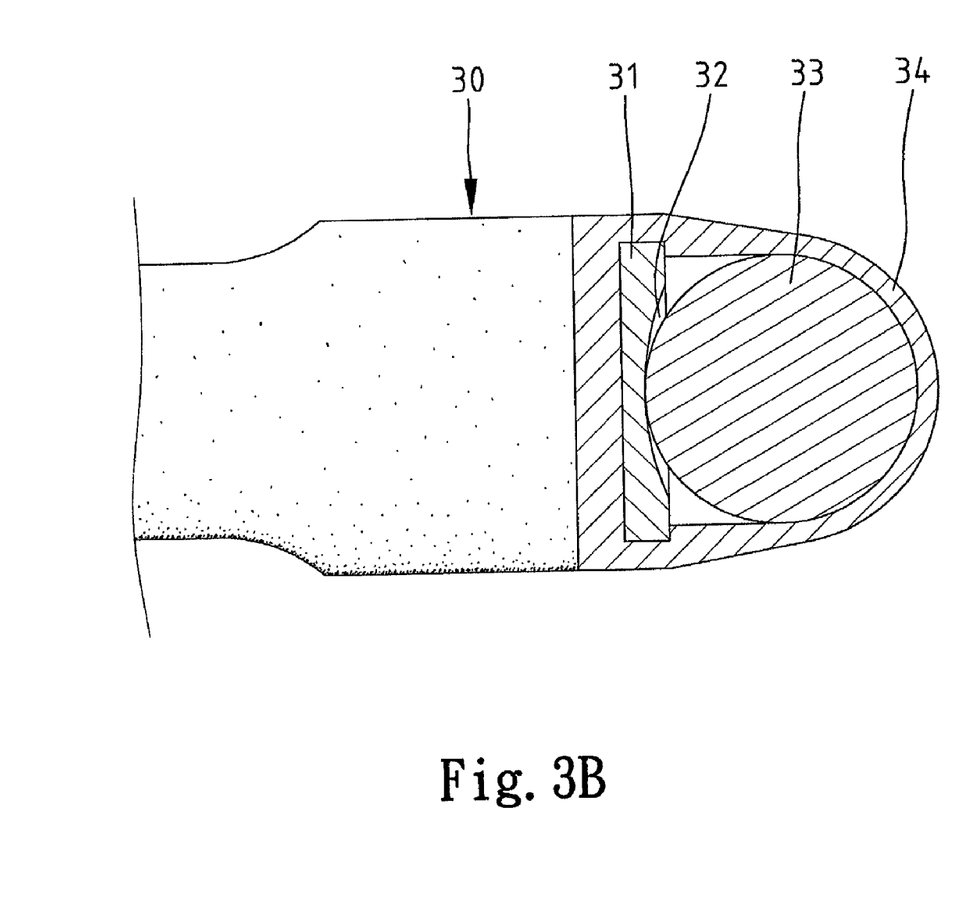
FIG. 3B is a sectional view taken along plane B—B in FIG. 3A.
Figure 7:
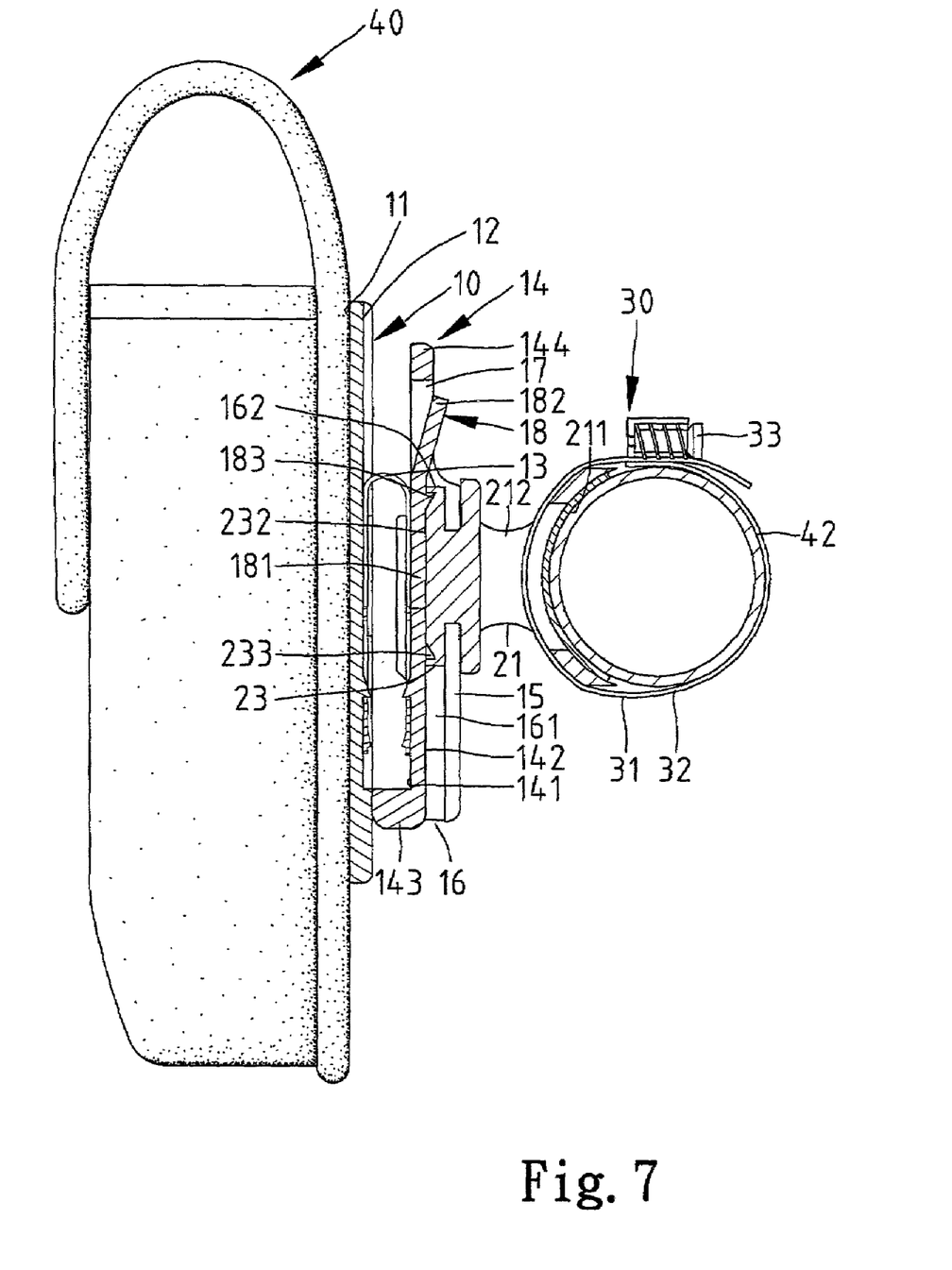
FIG. 7 is a schematic side view, partly sectioned, illustrating attachment of the cellular phone bag to a bicycle handlebar.

The engaging member 20 comprises a seat 21 having an arcuate bottom side 211 for embracing a portion of a bicycle handlebar. The seat 21 of the engaging member 20 further comprises an upper side 22 and a passage 212 between the upper side 22 and the arcuate bottom side 211. An attachment member 30 is provided to attach the engaging member 20 to the bicycle handlebar. Referring to FIGS. 3, 3A, and 3B, in this embodiment, the attachment member 30 comprises a fastening strap 31 having a first end to which a sleeve 34 is securely attached and a second end that is secured in place after passing through the passage 212 of the seat 21 and a gap 36 between the first end of the fastening strap 31 and the sleeve 34. The fastening strap 31 includes a plurality of retaining grooves 32 in an outer periphery thereof. A screw 33 is rotatably received in the sleeve 34 and has a threaded portion 35 engaged with several retaining grooves 32 of the fastening strap 31. When the screw 33 is turned in a direction, the second end of the fastening strap 31 is moved away from the screw 33 and thus tightly clamps around the bicycle handlebar 42 (FIG. 7). Thus, the engaging member 20 is securely attached to the bicycle handlebar 42. When the screw 33 is turned in a reverse direction, the second end of the fastening strap 31 is moved toward the screw 33 such that the fastening strap 31 is loosened. Thereafter, the engaging member 20 together with the attachment member 30 can be detached from the bicycle handlebar 42. Of course, the engaging member 20 can be detached from the attachment member 30 when required.

The engaging member 20 further comprises a polygonal member 23 and a neck 24 between the upper side 22 of the seat 21 and the polygonal member 23. The polygonal member 23 comprises a polygonal peripheral wall 231 defined by a plurality of pairs of parallel sides. In this embodiment, the polygonal peripheral wall 231 is square and thus has two pairs of parallel sides 203 and 204, 205 and 206. The polygonal peripheral wall 231 extends above an upper face 232 of the polygonal member 23. A positioning groove 233 is defined in the upper face 232 of the polygonal member 23 and located inside the polygonal peripheral wall 231. Preferably, the positioning groove 233 is polygonal and extends along the polygonal peripheral wall 231.

Figure 3C:
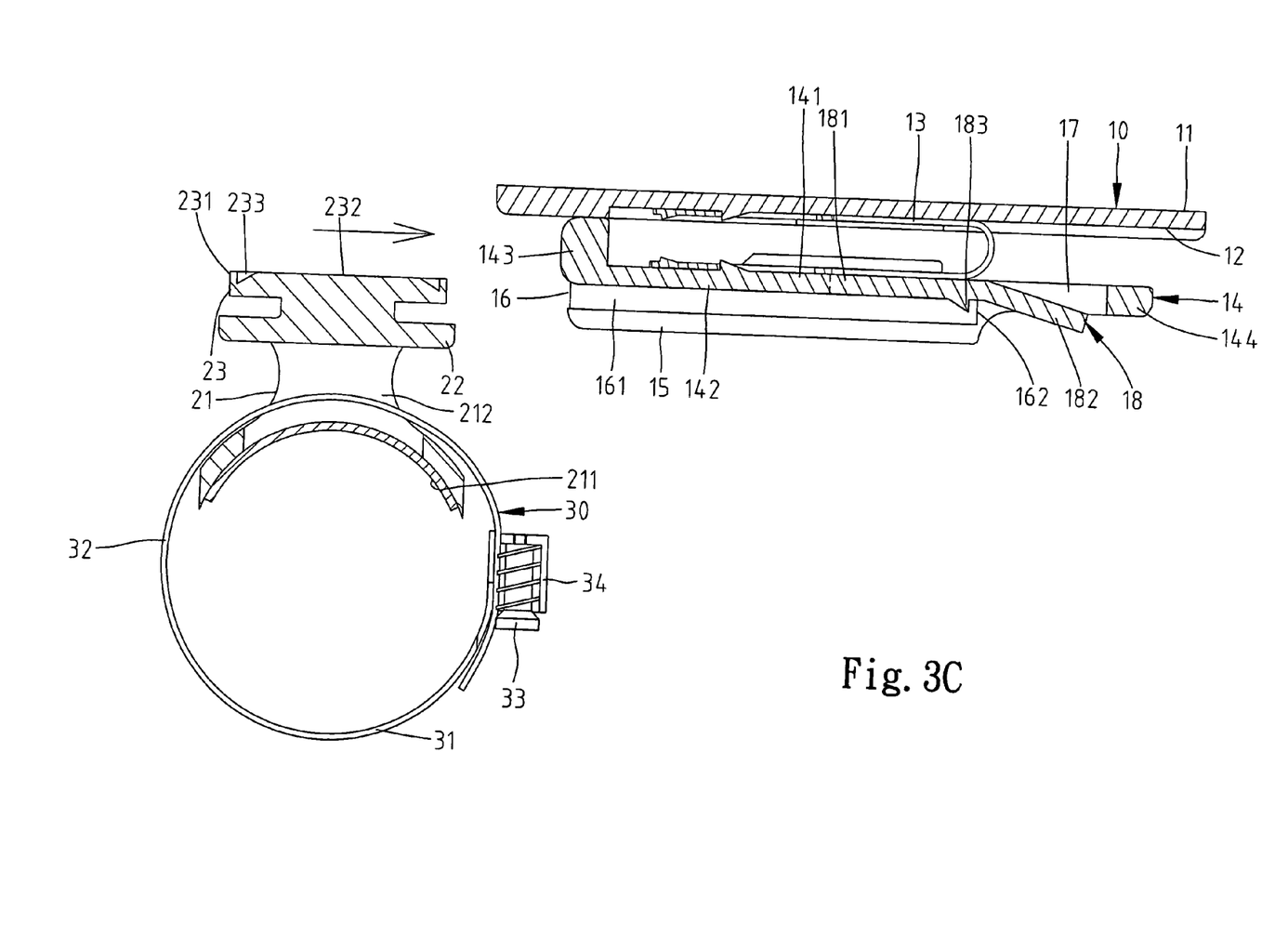
FIG. 3C is a side view, partly sectioned, illustrating assembly of the attaching apparatus.

Referring to FIGS. 2 and 3C, the fixing member 10 may be mounted to the engaging member 20 by means of moving the fixing member 10 along an axis 201 orthogonal to the sides 205 and 206 with the opening 16 of the clamp member 14 facing the polygonal member 23. The two sides 203 and 204 of the polygonal peripheral wall 231 slide along the groove 161 of the clamp member 14 when the member 14 slides relative to the polygonal member 23. The protrusion 183 of the resilient tongue 18 slides across the upper face 232 of the polygonal member 23 while the resilient tongue 18 deflects upward by means of direct contact with the upper face 232. The sliding movement of the clamp member 14 continues until the protrusion 183 of the resilient tongue 18 is securely engaged in the positioning groove 233 of the polygonal member 23 under the resilience of the resilient tongue 18. It is noted that the protrusion 183 of the tongue 18 has an inclined face 184 (FIG. 2A) facing the opening 16 of the groove 161 such that the disengagement of the protrusion 183 of the tongue 18 from the positioning groove 233 of the polygonal member 23 in the reverse direction is prevented, best shown in FIG. 3. The positioning groove 233 is so configured to cooperate with the protrusion 183 of the resilient tongue 18. The polygonal peripheral wall 231 also assists in retaining of the protrusion 183 of the resilient tongue 18. In addition, due to the polygonal configuration of the polygonal peripheral wall 231, relative rotation between the fixing member 10 and the engaging member 20 is prevented. When detaching the fixing member 10 from the engaging member 20 is required, the press end 144 of the clamp member 14 is pressed to disengage the protrusion 183 from the positioning groove 233 of the polygonal member 23, and the fixing member 10 is slid away from the engaging member 20 in a direction reverse to the engaging direction.

Figure 4:
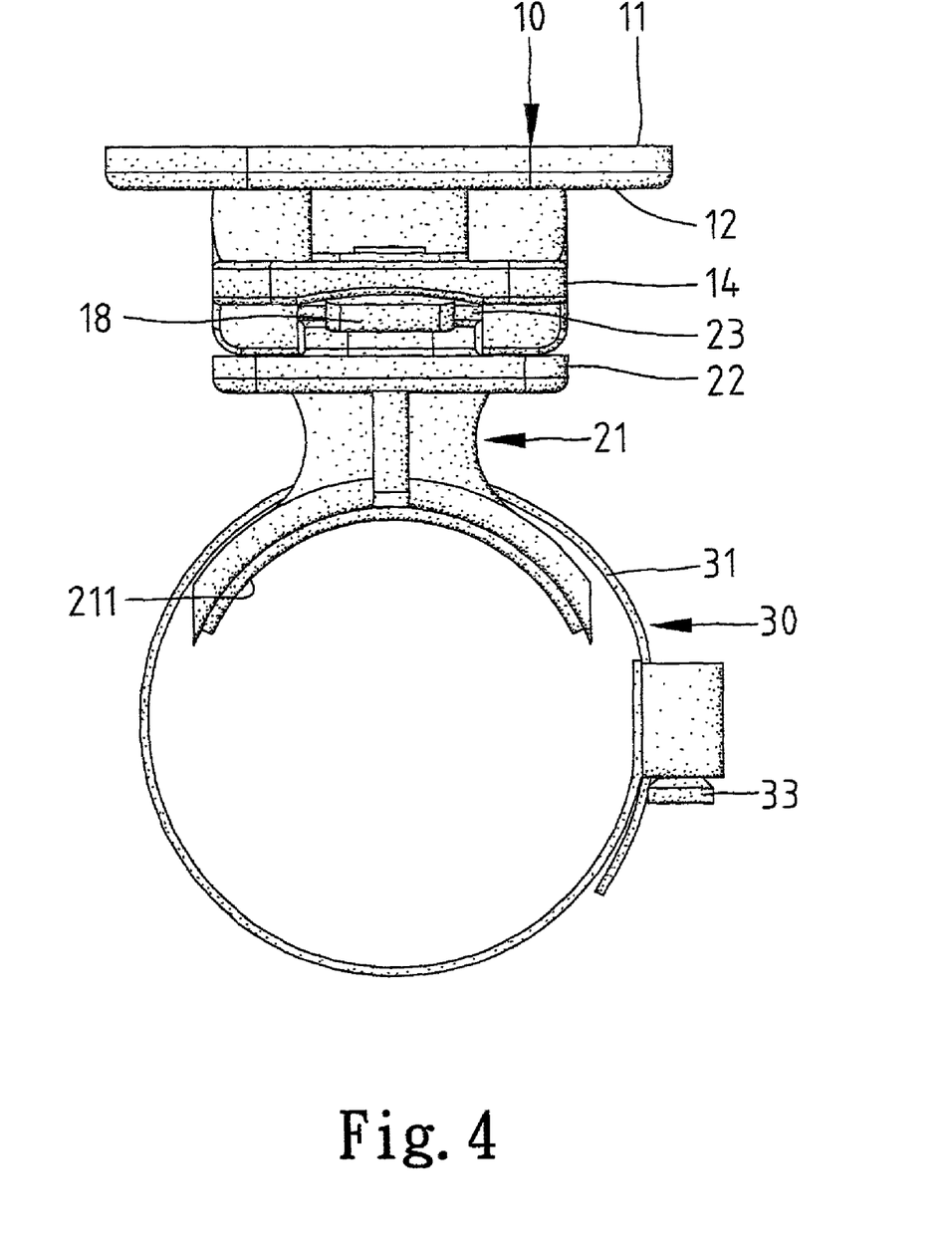
FIG. 4 is a side view of the attaching apparatus, wherein the fixing member is attached to the engaging member in a different orientation.

Referring to FIGS. 2 and 4, the fixing member 10 may be mounted to the engaging member 20 by means of moving the fixing member 10 along an axis 202 orthogonal to the axis 201. The engagement and disengagement between the fixing member 10 and the engaging member 20 along the axis 202 are identical to those along the axis 201 except that the fixing member 10 is located in an orientation that is 90° away from the previous orientation relative to the engaging member 20.

Referring to FIGS. 5 and 6, as mentioned above, a cellular phone bag 40 can be securely attached to the first side 11 of the fixing member 10 and carried by a belt 41 worn on a user. The engaging member 20 is securely attached to a bicycle handlebar 42 by the attaching member 30. When riding a bicycle, the fixing member 10 is disengaged from the belt 41 and then engaged with the engaging member 20 in a desired orientation such that the cellular phone can be located in an easy-to-access position, best shown in FIG. 7.

Figure 8:
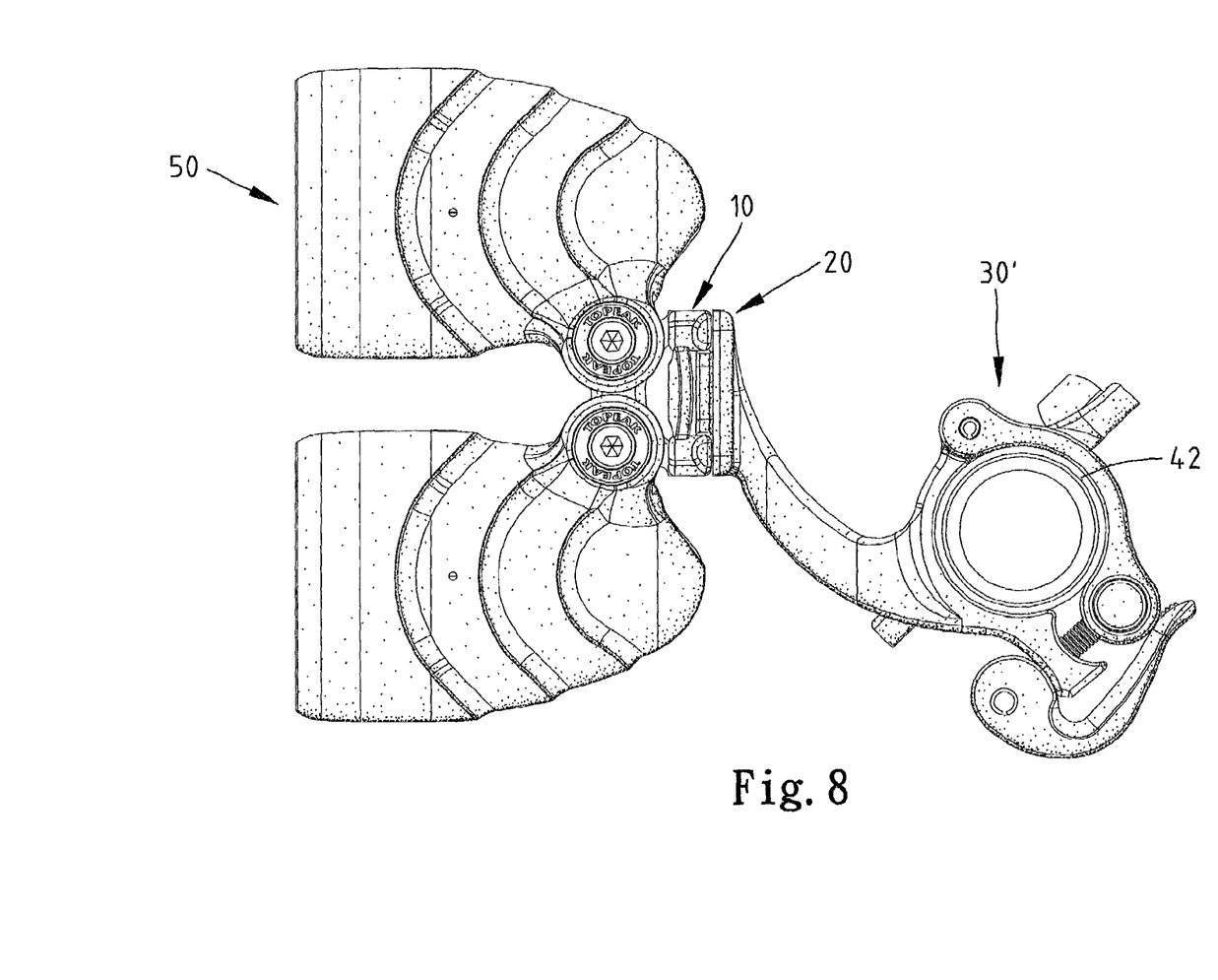
FIG. 8 is a schematic view illustrating a modified embodiment of the attaching apparatus for attaching headlamps to the bicycle handlebar.
Figure 9:
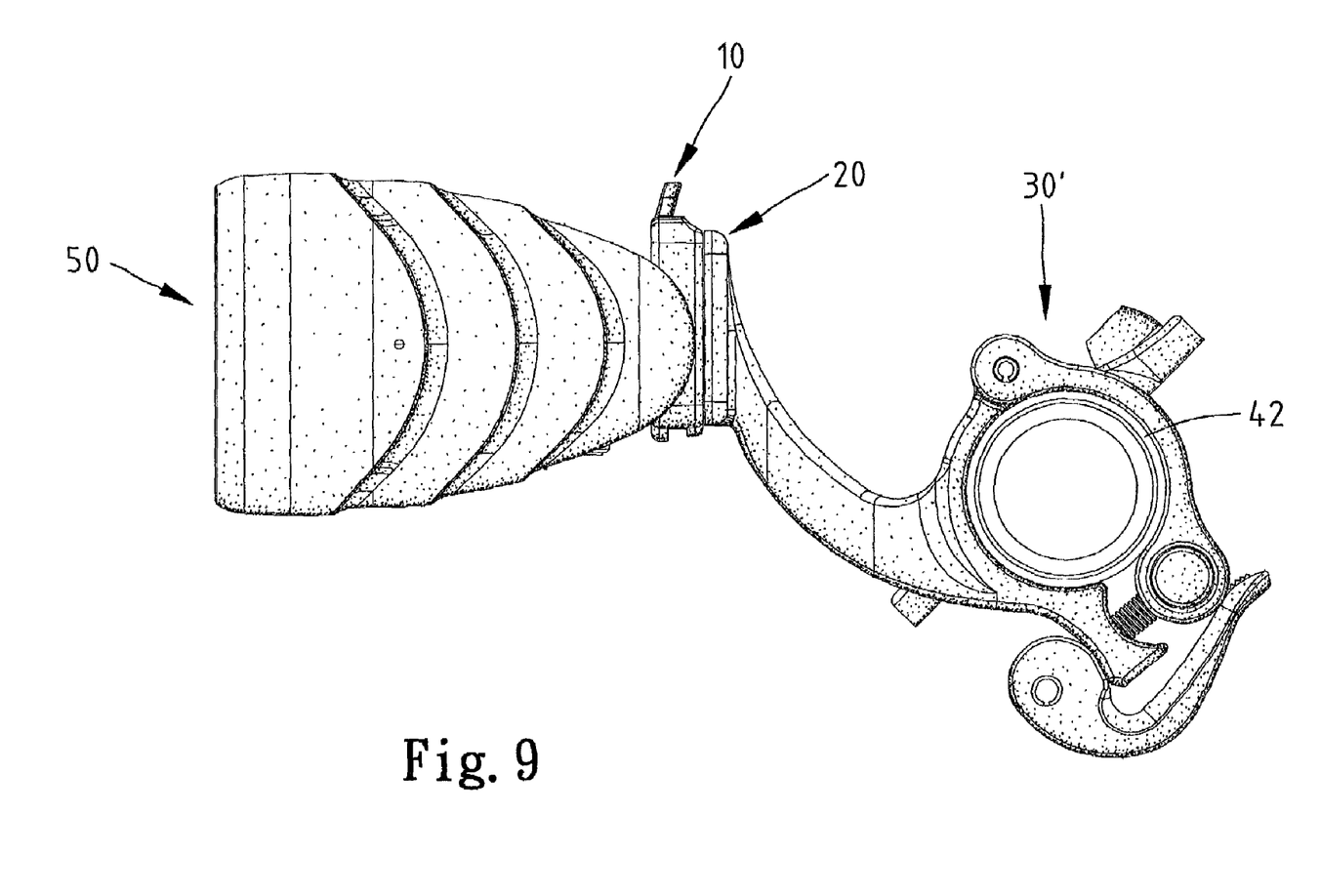
FIG. 9 is a side view similar to FIG. 8, wherein the headlamps are mounted in a different orientation with respect to the bicycle handlebar.

Referring to FIGS. 8 and 9, the attaching member can be a quick release 30' having a first end securely attached to the engaging member 20 and a second end releasably engaged with the bicycle handlebar 42. At least one headlamp 50 can be attached to the fixing member 10, which is engaged with the engaging member 20 in a desired orientation to provide optimal illumination. It is noted that the headlamps 50 in FIG. 8 are located in an orientation that is 90° away from that in FIG. 9.

The polygonal member 23 may be hexagonal for providing three orientation options for attaching the fixing member 10 to the engaging member 20. Of course, the polygonal member 23 may include eight, ten, or more sides to provide more options.

It is noted that the engaging member 20 remains on the handlebar 42 when reattaching the headlamp 50 or the cellular phone bag 40 to the engaging member 20.

Although the invention has been explained in relation to its preferred embodiment, it is to be understood that many other possible modifications and variations can be made without departing from the scope of the invention as hereinafter claimed.

What is claimed is:

1. An attachment apparatus comprising:
   a fixing member to which a first object is releasably attached;
   an engaging member adapted to be releasably attached to a second object, the engaging member comprising a polygonal member having at least two pairs of parallel sides, with the fixing member being selectively releasably engaged with one of said at least two pairs of parallel sides of the engaging member and thus located in one of at least two orientations with respect to the engaging member, wherein the fixing member comprises a first side to which the first object is attached, with the fixing member further comprising a second side opposite to the first side of the fixing member, an elastic member being attached to the second side of the fixing member, a clamp member being attached to the elastic member and comprising a press end and a clamp end, the clamp end of the clamp member being biased by the elastic member to engage with the second side of the fixing member, the clamp end of the clamp member being moved away from the second side of the fixing member when the press end is pressed, wherein the engaging member comprises a passage;
   a fastening strap extending through the passage, the fastening strap including a first end and a second end;
   a sleeve being securely attached to the first end of the fastening strap;
   a gap being defined between the first end of the fastening strap and the sleeve; and
   a screw being rotatably mounted in the sleeve, with the fastening strap including a plurality of retaining grooves in a side thereof, with the second end of the fastening strap extending through the gap with the screw engaging with several of said retaining grooves such that rotation of the screw in a direction causes the fastening strap to tightly clamp the second object and that rotation of the screw in a reverse direction causes the fastening strap to be loosened from the second object.

2. The attachment apparatus as claimed in claim 1, wherein the clamp member comprises a groove in a side facing away from the elastic member, the groove being selectively, releasably, and slidingly engaged with one of said at least two pairs of parallel sides of the engaging member.

3. The attachment apparatus as claimed in claim 2, wherein the polygonal member comprises an upper face and a polygonal peripheral wall having said at least two pairs of parallel sides, a positioning groove being defined in the upper face of the polygonal member.

4. The attachment apparatus as claimed in claim 1, wherein the second object is a bicycle handlebar.

5. The attachment apparatus as claimed in claim 4, wherein the first object is a cellular phone bag.

6. The attachment apparatus as claimed in claim 1, wherein the engaging member comprises an arcuate bottom face for embracing a bicycle handlebar.

7. An attachment apparatus comprising:
   a fixing member to which a first object is releasably attached, with the fixing member having a wall and first and second parallel ribs projecting outwardly from the wall, with a groove being defined by the wall and the first and second parallel ribs;
   an engaging member adapted to be releasably attached to a second object, the engaging member comprising a polygonal member having a polygonal peripheral wall defined by at least two pairs of parallel sides, with the groove of the fixing member being selectively, releasably and slideably engaged with one of said at least two pairs of parallel sides of the engaging member with said one of said at least two pairs of parallel sides of the polygonal member slideably captured in a first direction by the first and second parallel ribs and another of said at least two pairs of parallel sides of the polygonal member slideably captured in a second direction non-parallel to the first direction by the first and second parallel ribs and thus located in one of at least two orientations with respect to the engaging member; and
   an attaching member for releasably attaching the engaging member to the second object, wherein the second object is a bicycle handlebar, wherein the first object is a cellular phone bag, wherein the fixing member comprises a first side to which the cellular phone bag is attached, with the fixing member further comprising a second side opposite to the first side of the fixing member, an elastic member being attached to the second side of the fixing member, a clamp member being attached to the elastic member and comprising a press end and a clamp end, the clamp end of the clamp member being biased by the elastic member to engage with the second side of the fixing member, the clamp end of the clamp member being moved away from the second side of the fixing member when the press end is pressed.

8. The attachment apparatus as claimed in claim 7, wherein the clamp member comprises the groove in a side facing away from the elastic member.

9. The attachment apparatus as claimed in claim 8, wherein the polygonal member comprises an upper face, and a positioning groove being defined in the upper face of the polygonal member.

10. The attachment apparatus as claimed in claim 9, wherein the press end of the clamp member comprises a U-shaped slot, thereby defining a resilient tongue having a free end, the resilient tongue having a protrusion for engaging with the positioning groove of the polygonal member when the fixing member is engaged with the engaging member, the protrusion of the resilient tongue being disengaged from the positioning groove of the polygonal member when the free end of the resilient tongue is pressed.

11. The attachment apparatus as claimed in claim 10, wherein the positioning groove is polygonal and extends along the polygonal peripheral wall of the polygonal member.

12. An attachment apparatus comprising:
   a fixing member to which a first object is releasably attached, with the fixing member having a wall and first and second parallel ribs projecting outwardly from the wall, with a groove being defined by the wall and the first and second parallel ribs;

an engaging member adapted to be releasably attached to a second object, the engaging member comprising a polygonal member having at least two pairs of parallel sides, with the groove of the fixing member being selectively, releasably and slideably engaged with one of said at least two pairs of parallel sides of the engaging member slideably captured in a first direction by the first and second ribs and another of said at least two pairs of parallel sides of the polygonal member slideably captured in a second direction nonparallel to the first direction by the first and second ribs and thus located in one of at least two orientations with respect to the engaging member;

a positioning groove formed in the polygonal member; and a protrusion formed on the fixing member for releasable engagement with the positioning groove for selectively preventing the disengagement of the grooves of the fixing member from the parallel sides of the engaging member, wherein the polygonal member comprises an upper face and a polygonal peripheral wall having said at least two pairs of parallel sides, with the positioning groove being defined in the upper face of the polygonal member spaced from said at least two pairs of parallel sides.

13. The attachment apparatus as claimed in claim 12, further comprising an attaching member for releasably attaching the engaging member to the second object.

14. The attachment apparatus as claimed in claim 13, wherein the attaching member is a quick release.

15. The attachment apparatus as claimed in claim 14, wherein the first object is a headlamp.

16. The attachment apparatus as claimed in claim 13, wherein the engaging member comprises an arcuate bottom face for embracing a bicycle handlebar.

17. The attachment apparatus as claimed in claim 12, wherein the positioning groove is polygonal and extends along the polygonal peripheral wall of the polygonal member.

18. An attachment apparatus comprising:

a fixing member to which a first object is releasably attached; and an engaging member adapted to be releasably attached to a second object, the engaging member comprising a polygonal member having at least two pairs of parallel sides, with the fixing member being selectively releasably engaged with one of said at least two pairs of parallel sides of the engaging member and thus located in one of at least two orientations with respect to the engaging member, wherein the fixing member comprises a first side to which the first object is attached, with the fixing member further comprising a second side opposite to the first side of the fixing member, an elastic member being attached to the second side of the fixing member, a clamp member being attached to the elastic member and comprising a press end and a clamp end, the clamp end of the clamp member being biased by the elastic member to engage with the second side of the fixing member, the clamp end of the clamp member being moved away from the second side of the fixing member when the press end is pressed, wherein the clamp member comprises a groove in a side facing away from the elastic member, the groove being selectively, releasably, and slideably engaged with one of said at least two pairs of parallel sides of the engaging member, wherein the polygonal member comprises an upper face and a polygonal peripheral wall having said at least two pairs of parallel sides, a positioning groove being defined in the upper face of the polygonal member, wherein the press end of the clamp member comprises a U-shaped slot, thereby defining a resilient tongue having a free end, the resilient tongue having a protrusion for engaging with the positioning groove of the polygonal member when the fixing member is engaged with the engaging member, the protrusion of the resilient tongue being disengaged from the positioning groove of the polygonal member when the free end of the resilient tongue is pressed.

19. The attachment apparatus as claimed in claim 18, wherein the positioning groove is polygonal and extends along the polygonal peripheral wall of the polygonal member.

* * * * *